March 30, 1965 E. E. SCHNELL 3,175,737
FERTILIZER DISTRIBUTOR
Filed Nov. 13, 1962 6 Sheets-Sheet 1
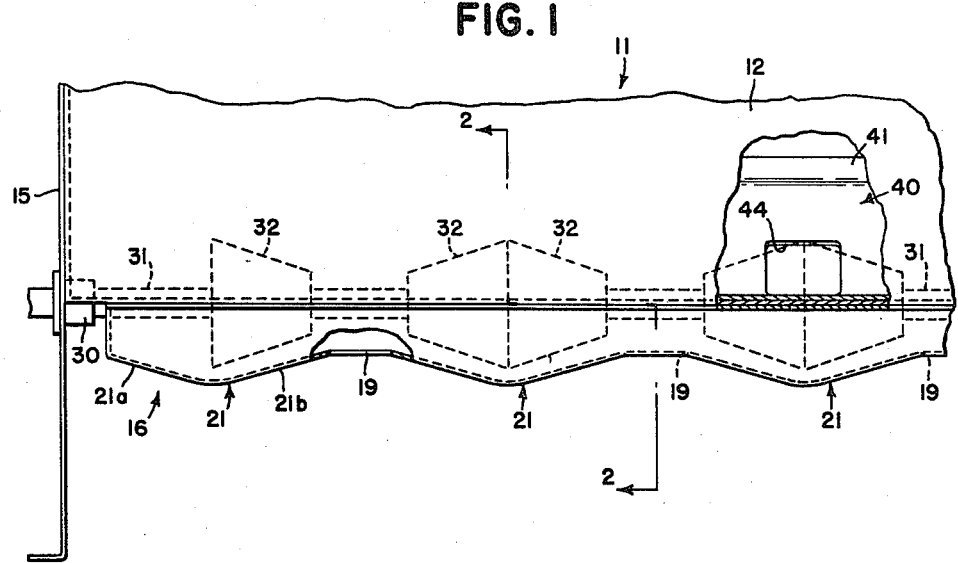
INVENTOR.
ERNST E. SCHNELL
BY
Roger C. Johnson
ATTORNEY

INVENTOR.
ERNST E. SCHNELL

March 30, 1965 — E. E. SCHNELL — 3,175,737
FERTILIZER DISTRIBUTOR
Filed Nov. 13, 1962 — 6 Sheets-Sheet 3

INVENTOR.
ERNST E. SCHNELL
BY
Roger C. Johnson
ATTORNEY

March 30, 1965  E. E. SCHNELL  3,175,737
FERTILIZER DISTRIBUTOR

Filed Nov. 13, 1962  6 Sheets-Sheet 4

INVENTOR.
ERNST E. SCHNELL
BY
Roger C. Johnson
ATTORNEY

March 30, 1965 E. E. SCHNELL 3,175,737
FERTILIZER DISTRIBUTOR
Filed Nov. 13, 1962 6 Sheets-Sheet 5
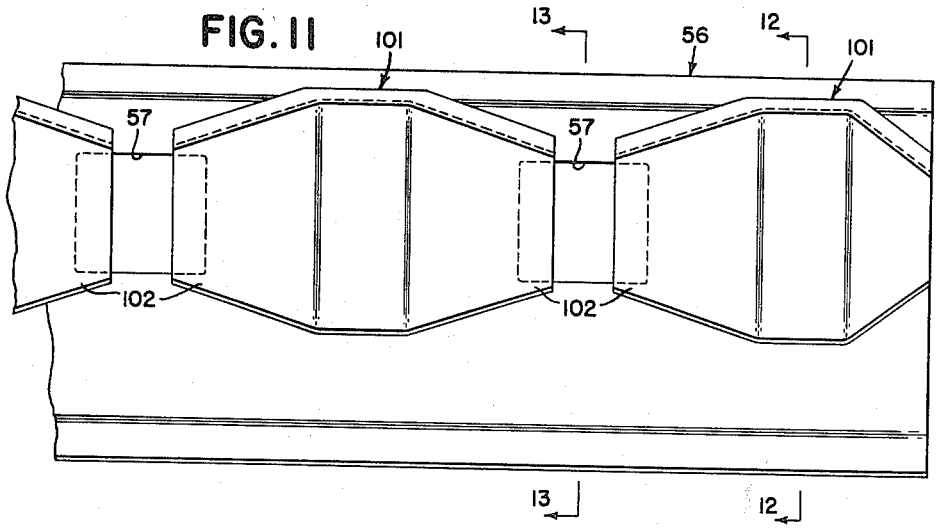
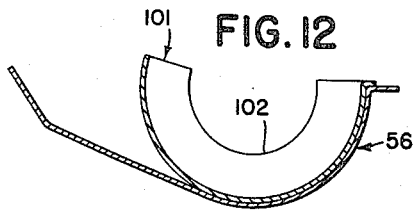
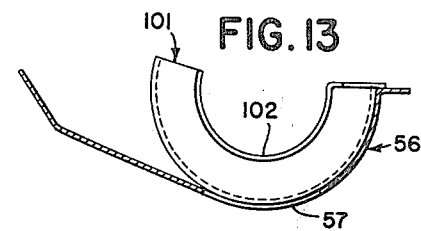
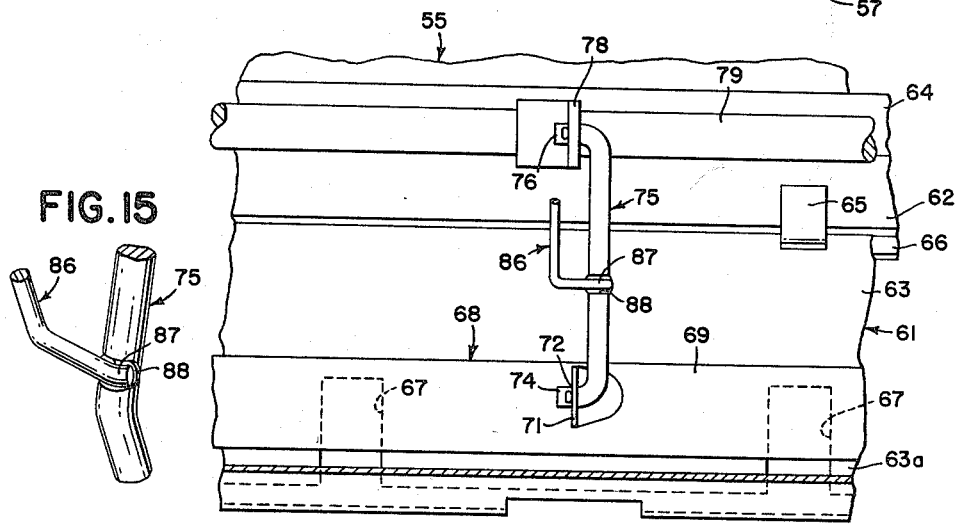
INVENTOR.
ERNST E. SCHNELL March 30, 1965     E. E. SCHNELL     3,175,737
FERTILIZER DISTRIBUTOR Filed Nov. 13, 1962     6 Sheets-Sheet 6

INVENTOR.
ERNST E. SCHNELL
BY
Roger C Johnson
ATTORNEY

United States Patent Office 3,175,737
Patented Mar. 30, 1965

3,175,737
FERTILIZER DISTRIBUTOR
Ernst E. Schnell, West Bend, Wis., assignor to Deere & Company, Moline, Ill., a corporation of Delaware
Filed Nov. 13, 1962, Ser. No. 236,793
8 Claims. (Cl. 222—267)

This invention relates generally to agricultural implements and more particularly to implements such as fertilizer distributors.

The object and general nature of this invention is the provision of fertilizer distributing means including feed mechanism so constructed and arranged so as to apply the fertilizer uniformly to the ground irrespective of variations in the position of the fertilizer hopper, that is, whether tilted in a fore-and-aft direction, as when going up or down hill, or tilted or angled laterally, as when passing along a side hill.

More specifically, it is a feature of this invention to provide a fertilizing distributor having conical feed rotors arranged to feed material uniformly through associated discharge openings in the hopper bottom irrespective of changes in the position of the hopper relative to the horizontal.

These and other objects and advantages of the present invention will be apparent to those skilled in the art after a consideration of the following detailed description, taken in conjunction with the accompanying drawings in which:

FIG. 1 is a fragmentary rear elevation showing a portion of a grain drill hopper and associated parts in which the principles of this invention have been incorporated, certain portions being shown in section.

FIG. 2 is an end view of the hopper shown in FIG. 1, certain portions being broken away and shown in section.

FIG. 3 is a view similar to FIG. 2, showing the hopper in a forward tilted position, as when driving down a hill.

FIG. 11 is a fragmentary plan view of a portion of the hopper bottom of the form of the invention shown in FIG. 8.

FIGS. 12 and 13 are sectional views taken along the lines 12—12 and 13—13 of FIG. 11.

Figure 8:
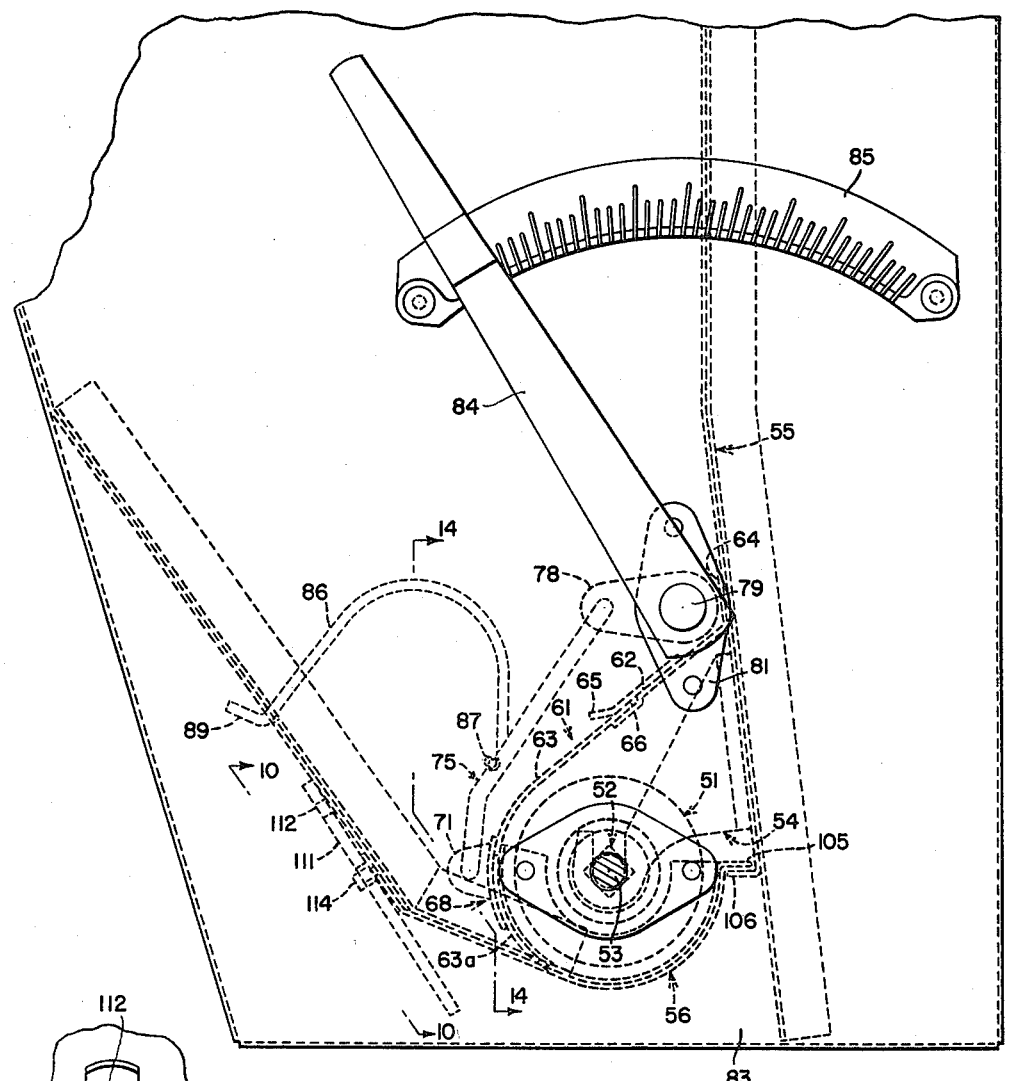
FIG. 8 is an end view, somewhat similar to FIG. 2, showing a modified form of this invention.

FIG. 14 is a fragmentary view, taken along the line 14—14 of FIG. 8.

FIG. 15 is a fragmentary perspective view of a portion of the gate-biasing means.

Figure 16:
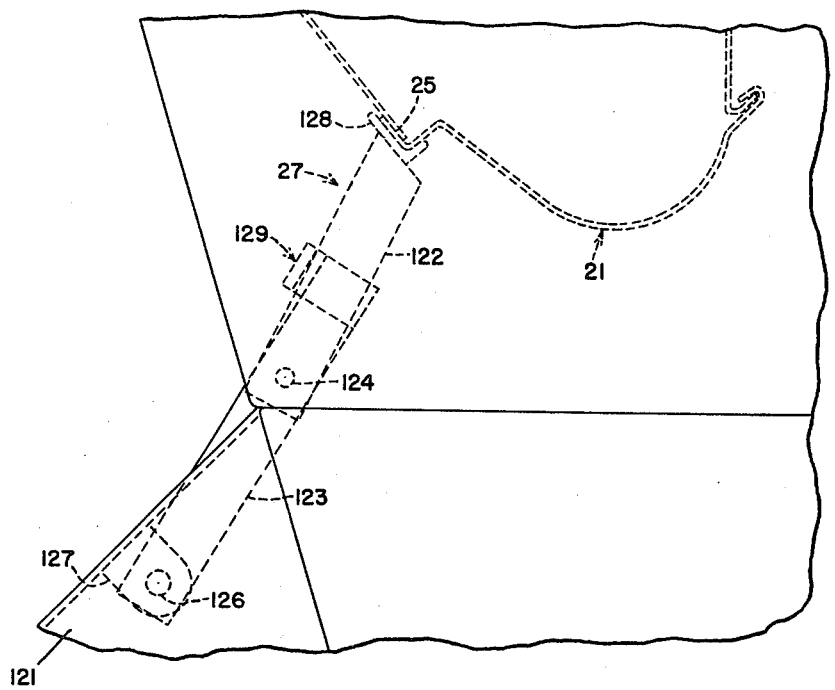

FIG. 16 is a fragmentary end view, similar to FIG. 2 showing a second form of hopper bottom holding latch.

Referring first to FIGS. 1 and 2, the hopper of a fertilizer distributor of a grain drill is shown at 11 and includes front and rear side sheets 12 and 13 and end sheets 14 and 15 (FIG. 2) suitably welded or otherwise fastened together to form a container. The hopper bottom is indicated at 16 and is of special construction. First, a series of spaced apart fertilizer outlet openings 19, generally rectangular in configuration, are formed in the hopper bottom from end to end of the hopper. Second, in between the several outlet openings 19 there are depressed sections 21 generally semicircular in cross section (FIGS. 2 and 3) and including oppositely angled conoidal portions 21a and 21b. One flange 23 of the hopper bottom 21 is formed as a hook adapted to engage over an upturned lip 24 on the lower part of the front side 12. At the other side of the hopper bottom 21 there is a rearwardly extending flange 25 that seats flat against the lower inwardly extending flange 26 on the lower part of the front sheet 13. Suitable latch means 27, described below in detail, serves as quick detachable means locking the flange 25 to the hopper. By releasing the latch means 27 the bottom 21 may easily and quickly be dropped down and/or removed for cleaning out the fertilizer as at the end of the day.

The means provided, according to this invention, for feeding fertilizer or other material through the outer openings 19 is so constructed and arranged that variations in the position of the hopper, as may occur when passing over uneven ground, going up and down hills, passing alongside hills, and the like, do not materially affect normal accuracy and uniformity of distribution. Such means will now be described.

Figure 4:
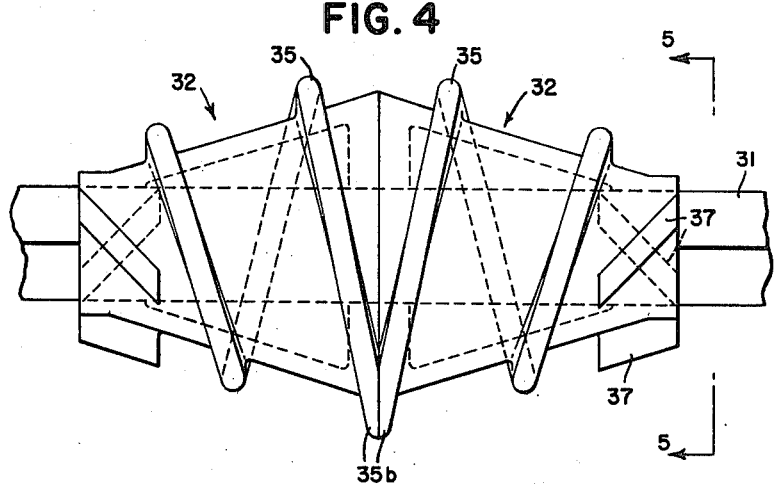
FIG. 4 is an enlarged detailed view of a dual auger-type rotor and the associated shaft on which it is mounted.
Figure 5:
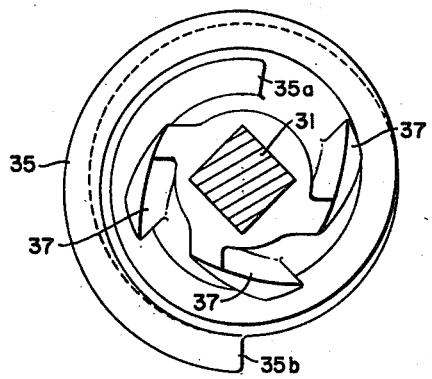
FIG. 5 is a sectional view taken along the line 5—5 of FIG. 4.

The hopper ends 14 and 15 carry bearing means 30 in which a shaft 31 that is square in cross section is journaled. Spaced along the shaft 31 is a plurality of dual auger-type rotors. Each of these feed rotors is formed from two conical members 32, which may be cast, and the sections 32 are arranged back-to-back, as shown in FIG. 4. Each of the sections 32 is provided with a spiral rib 35 that follows the conical form of the section, and adjacent the small end of each section 32 there are angled fins 37. Preferably, there are three fins 37 on each section 32 arranged at 90° angular disposition and the innermost end 35a of the rib 35 lies in a position between the two adjacent ribs 37, as best shown in FIG. 5.

The rotors are spaced along the shaft 31, being held thereon by any suitable means, so that the small ends of the sections 32 are spaced apart and lie over the discharge openings 19, as best shown in FIG. 1, whereby there is a free flow of fertilizer toward and through the openings 19 when the shaft 31 and rotors are rotated. From FIG. 4 it will be seen that the spiral ribs 35 serve to feed material in the hopper bottom sections 21 toward the openings 19 and the angled ribs 37 are constructed and arranged to feed fertilizer material directly to the openings 19.

As best shown in FIG. 2, flow of material from the hopper to the feed rotors is controlled by means of a baffle 40. The baffle 40 includes front and rear flanges 41 and 42 secured in any suitable way to the front and rear walls 12 and 13. The lower part of the central section of the baffle is provided with a plurality of openings 44 arranged in spaced relation. Preferably, as shown in FIG. 1, there is an opening 44 directly adjacent the end portion of each pair of associated conoidal sections 32, 32. Thus, material that moves downwardly from the main part of the hopper flows through the openings 44 into the space below the baffle 40, and the spiral ribs 35 then shifts the material axially and upwardly toward the open space between the sections 32, 32, aided by the angled ribs 37 that ensure the passage of the material toward and through the discharge openings 19.

The rate of flow is determined by the rate of rotation of the rotors, and any suitable speed change means may be incorporated in the means for driving the shaft 31.

One of the particular advantages of the present invention as incorporated in the means described above is that variations in the position of the grain drill or other implement to which the fertilizer distributor of this invention is connected or of which it forms a part, will not affect the uniformity of material flow. That is, the implement may be operating on a side hill, for example, in which one end of the hopper is lower than the other, or the implement may be driven uphill, or downhill, in which case the hopper is tilted forwardly or rearwardly relative to a normal horizontal position (FIG. 2), and fertilizer flow will remain substantially uniform.

Figure 6:
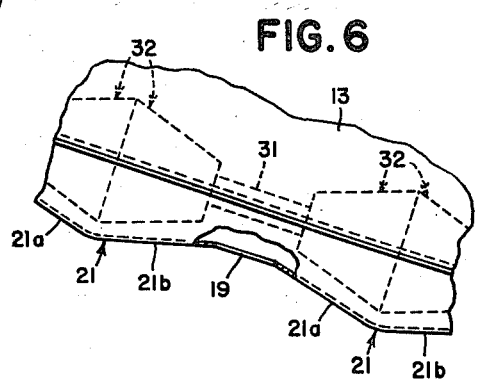
FIG. 6 is a view somewhat similar to FIG. 1 but more fragmentary in nature, illustrating in somewhat exaggerated form the action of the fertilizer distributor of this invention when operating on a side hill.

FIG. 3, for instance, is a fragmentary illustration, somewhat exaggerated, of the hopper disposed in a forwardly and downwardly tilted position relative to its normal or horizontal position as illustrated in FIG. 2. As will be seen from FIG. 3, in either forward or rearward tilted position of the hopper the lower discharge openings 19 will remain at the bottom of the hopper and the rate of flow will not appreciably vary because when the hopper is tilted the change in elevation of the openings 19, as compared with the elevation of the openings 19 in the horizontal position of the hopper, is a negligible amount and the openings 19 are still the bottommost portion of the hopper. Similarly, when the grain drill is operated with one end of the hopper higher than the other, the tilted position being represented diagrammatically in FIG. 6, it will be seen that any reduction of the rate of flow due to the elevated position of one of the sections 32 will be offset by the increased action of the opposite and downwardly angled section 32 at the other side of the discharge opening 19. Thus, when operated in a tilted position, what flow is lost by virtue of one section 32 being tilted upwardly is gained by the other section 32 being tilted downwardly, thus providing substantially the same total rate of flow for each opening 19 as when the hopper is level.

Figure 7:
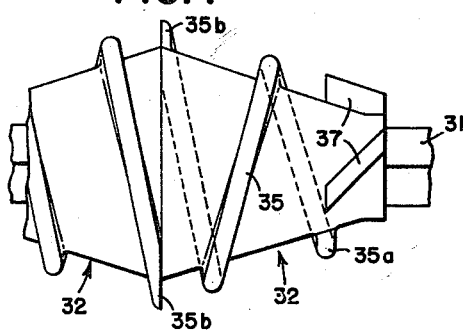
FIG. 7 is a view taken on a smaller scale but similar to FIG. 4, showing a modified arrangement of a feed rotor.

It will be seen from FIGS. 4 and 5 that the angled ribs 37 are three in number and that they augment the action of the laterally outermost tip (35a, FIG. 5) of the helix or rib 35, cooperating with the latter to provide uniformity of movement of the fertilizer material directly to the opening 19. FIG. 4 shows the conical sections arranged so that the radially outermost tips 35b are disposed in registry with one another, which facilitates assembly of the rotors on the shaft, but a slight increase in uniformity of flow may be secured if the sections are assembled displaced 180° from one another, as compared with arrangement as shown in FIG. 4. This may be done readily since the shaft 31, and the corresponding openings in the sections are square in section. FIG. 7 is a view similar to FIG. 4 illustrating the 180° displaced arrangement.

Another modified form of this invention is shown in FIGS. 8 et seq. and will now be described. The rotors 51 are of substantially the same construction as those shown in FIGS. 4 and 5 and are mounted on a square shaft 52 having reduced ends 53 journaled in a pair of bearing brackets 54 fixed in any suitable way to the forward wall 55 of the hopper. The latter is constructed substantially like the hopper described above except that it includes a main section 56 that is generally half-round in cross-section and is provided with bottom openings 57 located substantially between the spaced apart inner ends 51a of the rotor sections.

As best shown in FIG. 8, a baffle 61 overlies the rotors 51 and includes two principal parts 62 and 63. The upper part 62 is shaped so that an upper flange 64 lies flat against and is suitably fixed to the forward wall 55 of the hopper. The lower edge of the part 62 has a lower offset section 66 that receives the upper edge of the lower part 63. A plurality of clips 65 hold the parts 62 and 63 together at this point. The lower portion of the lower baffle part 63 is arcuate, as indicated at 63a, about the axis of the shaft 53. The arcuate portion 63a of the lower baffle part is provided with a plurality of generally vertical slots 67 (FIG. 14) over which a generally transverse gate 68 is mounted for movement. The gate 68 comprises an elongated strip 69, arcuate in section so as to closely interfit with the slotted portion 63a of the baffle 61. At two points in the length of the gate the strip 69 has tabs 71 punched outwardly from the strip and apertured, as at 72, to receive connections for shifting the gate to different positions relative to the associated baffle slots 67.

In the form of the invention shown in FIGS. 1–7, variation of flow is secured by virtue of change of speed gearing connected with the shaft 31. In the form of the invention shown in FIGS. 8 et seq., variation of flow is secured by means of the gate 68. Shifting the gate to close off different portions of the upper parts of the hopper slots 67 forms a means for securing variation of flow in this form of the invention.

The means for adjusting the gate 68 will now be described. The apertured tabs or lugs 71 on the back side of the gate 68 receive the lower laterally turned ends 74 of the associated rod or link 75. The upper end 76 of each link is turned laterally and pivotally connected into an apertured arm 78 that is fixed in any suitable way to a rockshaft 79 supported on suitable bearings 81 carried by the hopper ends 83. The shaft 79 extends at one end outwardly of the associated hopper end and carries an adjusting lever 84 that moves along a ridged sector 85 fixed in any suitable way to the associated hopper end. Shifting the lever 84 serves to adjust the position of the gate 68.

The gate 68 is evenly pressed against the arcuate section 63a of the baffle by means of a pair of spring wire members 86. Each member 86 is so formed that an end 87 bears against the notched portion 88 (FIG. 15) of the associated link 75, the other end of each spring wire 86 being bent laterally to form a hook 89 that engages in an opening 91 in the rear wall 92 of the hopper.

Figure 9:
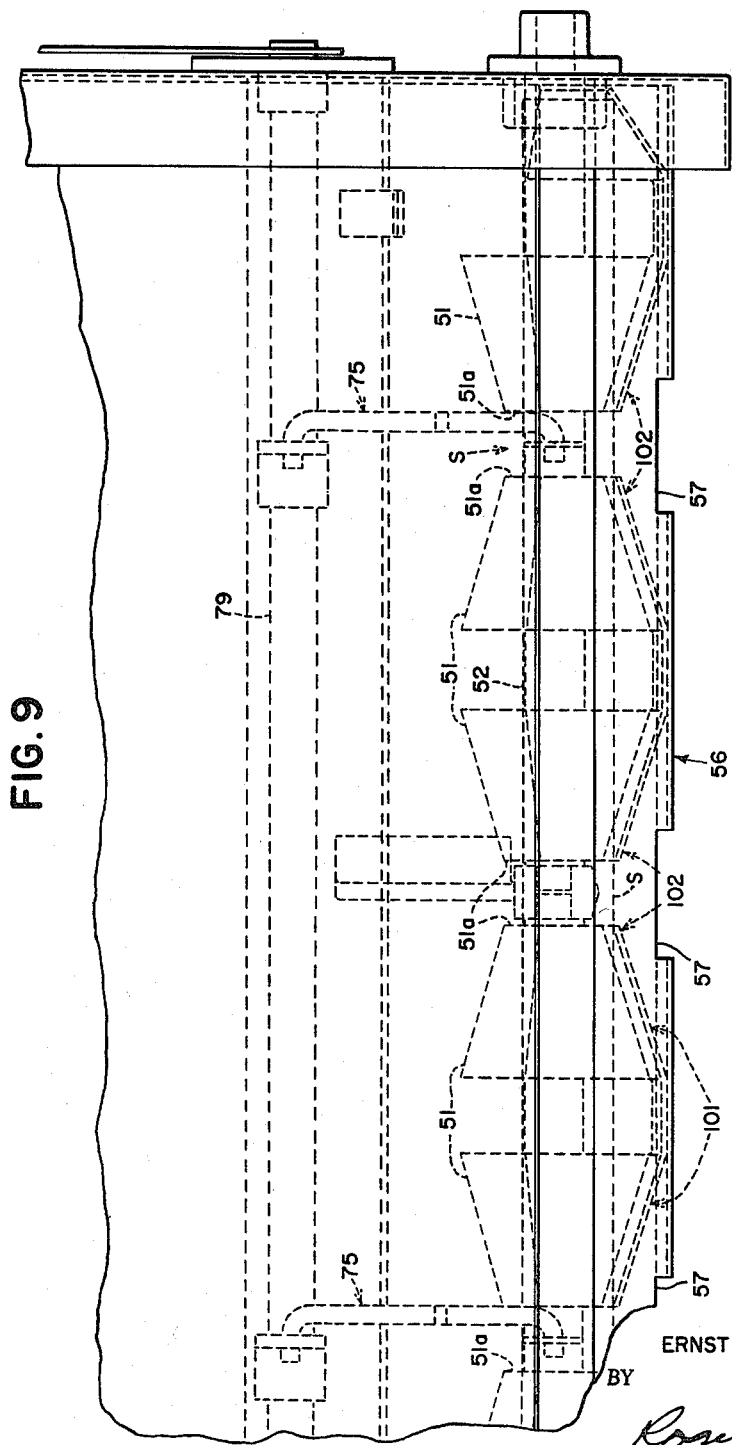
FIG. 9 is a rear elevation, somewhat similar to FIG. 1, showing certain details of the form of the invention shown in FIG. 8.

In the form of the invention shown in FIGS. 8 et seq., the hopper bottom 56 differs from the hopper bottom 21 shown in FIGS. 1–3 in that the hopper bottom 56 is in the form of a semicylindrical member extending longitudinally of the hopper and carrying the openings 57 substantially directly underneath the open spaces between the small ends 51a of the conical sections. However, directly underneath the dual auger-type rotors 51 are troughlike members 101 having conoidal end sections 102 corresponding generally to the configuration of the lower portions of the rotors 51, as will best be shown in FIG. 9. The conoidal sections 102 extend axially and upwardly along the lower portions of the associated rotor sections, and the ends of the conoidal sections terminate substantially in the same planes as the planes of the ends of the associated rotor sections, as best shown in FIG. 9. This leaves sufficient space S for material, directed axially by the spirals on the rotors 51, to discharge over the ends of the conoidal portions and fall directly downwardly through the adjacent hopper bottom openings 57.

Figure 10:
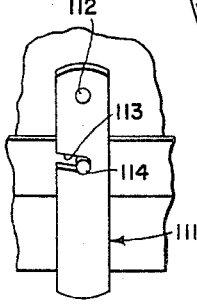
FIG. 10 is an enlarged detailed view of one form of hopper bottom latch, being taken on the line 10—10 of FIG. 8.

In FIGS. 8 and 10 it is to be noted that the hopper bottom 56 is held in position by two means, one constituting a flange 105 resting on an inwardly directed flange or shoulder 106 carried by the front wall 55 of the hopper. The other means comprises a plurality of latches 111 each pivoted on a stud 112 carried by the hopper and each latch including an arcuate slot 113 that is adapted to engage a stud 114 fixed to the upper portion of a flange 115 on the rear ends of the hopper bottom 56. Thus, by swinging the latches away from the studs 114 the rear portion of the hopper may be dropped downwardly and then the flange 105 disengaged from the shelf or shoulder 106 to completely separate the bottom 56 from the hopper.

The hopper bottom latch 27, mentioned above in connection with FIG. 2, is different from the latch 111 described above. The main frame of the fertilizer distributor shown in FIGS. 2 et seq., supports a generally downwardly and rearwardly extending hanger 121 upon which a footboard (not shown) is supported. The latch means 27 includes a pair of toggle links 122 and 123 pivotally interconnected, as at 124. The lower end of the link 123 is pivoted on a stud 126 carried by a bracket 127 fixed ot each hanger 121, it being understood that there are a plurality of hangers 121 on which the footboard is supported, and there are as many pairs of toggle links 122, 123 as there are hangers 121. The upper end of the upper toggle link 122 carries a short length of angle 128 that is adapted to fit against the flange portion 25 of the hopper bottom 21. A stop clip 129 is fixed to the upper end of each link 123, which extends upwardly beyond the interconnecting pivot 124. The stop 129 determines the overcenter position of the toggle links 122, 123, as shown in FIG. 16. In this position the pairs of toggle links 122, 123 act to hold the rear flange of the hopper bottom 21 up in leak tight position. However, whenever it is desired to lower the hopper bottom 21, all that it is necessary to do is to swing the pivotally interconnected portions of the toggle links 122, 123 upwardly to release the hopper bottom 21 which then permits swinging the latter downwardly or entirely disconnecting the latter from the hopper itself.

While I have described above the preferred structure in which the principles of this invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a material distributor, a hopper having a bottom provided with a plurality of discharge openings, material feeding means disposed in said hopper for delivering material to said openings, said hopper bottom including spaced apart elevated portions having said discharge openings and depressed generally conoidal portions between said elevated portions, said material feeding means including a plurality of dual auger-type rotors each having a pair of generally conoidal sections spaced from each other and disposed on opposite sides of a respective one of said discharge openings, the conoidal sections being of complementary angularity relative to said depresed conoidal portions and arranged to shift material generally upwardly to the associated discharge opening from opposite sides thereof, whereby when the hopper is tilted so that one end is higher than the other, the increased flow of material fed to each opening from one side thereof is compensated by a reduction of flow to said opening from the other side.

2. In a material distributor, a hopper having a bottom provided with discharge openings, material feeding means disposed in said hopper for delivering material to said openings, baffle means carried by said hopper and overlying said feeding means, said baffle means having openings providing for movement of material therethrough to said feeding means, and means controlling the rate of flow of material through said baffle, said rate controlling means including a part movable along said baffle openings, and resilient means acting against said movable part for holding it against said baffle, said resilient means comprising a shifter rod connected with said movable part for moving it, and a spring member connected at one end with the hopper and at the other end with said shifter rod.

3. The invention set forth in claim 1, further characterized by said generally conoidal sections having spiral ribs, the sections of each pair being arranged with their larger portions disposed in back-to-back relation and lying over the lowermost parts of said depressed hopper portions, and the smaller portions of said conoidal sections being disposed closely adjacent the associated discharge opening.

4. The invention set forth in claim 3, further characterized by said smaller portions of said conoidal sections carrying a plurality of relatively short angled ribs arranged out of alignment with the associated spiral ribs, said ribs extending radially from and lying diagonally relative to the axis of rotation of said conoidal sections.

5. In a material distributor, a hopper having a hopper bottom formed with a series of alternate depressions and elevations that are arcuate in cross section and extend longitudinally of the hopper, a rotor shaft rotatably supported in the hopper longitudinally thereof and located above said series of alternate depressions and elevations, a plurality of feed rotors fixed to said shaft and spaced on the latter so that the feed rotors are disposed substantially directly above said depressions, respectively, each feed rotor comprising a pair of conical sections disposed back-to-back so as to provide an enlarged central part and opposite end portions of smaller diameter, the bottom portion of the associated adjacent bottom depression being of complementary configuration, said conical sections carrying spiral feed ribs acting to move material to be dispensed laterally outwardly from the central part of the associated bottom depression toward the adjacent elevations, said end portions of the conical sections being spaced apart axially and the space between said end portions overlying said elevations, and said elevations being apertured to provide discharge openings to receive and pass material to be dispensed from the hopper.

6. In a material distributor, a hopper having front and rear side walls and a hopper bottom provided with openings in the lower portion thereof, material feeding means rotatable adjacent said openings and adapted to deliver material through said openings, a baffle disposed over said material feeding means and having one edge fixed to one of said hopper side walls and the other edge portion formed arcuately relative to said rotatable feeding means and interconnected with the hopper bottom at the side of said feeding means opposite said one side wall, there being a space between said other edge portion of the baffle and the other of said side walls, said arcuate edge portion of the baffle having openings therein accommodating movement of said material from said space through said last-mentioned openings to said material feeding means, and gate means movable arcuately over the arcuate baffle edge portion and along said last-mentioned openings for controlling the rate of movement of material from said space through said openings.

7. In a material distributor, a hopper having a bottom provided with alternately arranged depressions and raised sections, conical rotors rotatable over said depressions and carrying spiral ribs adapted to feed material upwardly from said depressions to said raised sections, means forming discharge openings in said raised sections, each discharge opening receiving material from two of said conical rotors except at the ends of the hopper, and baffle means mounted in said hopper over said rotors and including openings located so as to direct material above said baffle to the larger diameter portions of said rotors.

8. The invention set forth in claim 7, further characterized by said hopper bottom being removable and means removably connecting said hopper bottom to said hopper, comprising interengageable shoulder and flange means at one side of the hopper, and releasable latch means interconnecting the other side of said hopper bottom with the hopper.

References Cited in the file of this patent

UNITED STATES PATENTS

| | | |
|---|---|---|
| 36,159 | Jones et al. | Aug. 12, 1862 |
| 150,511 | Baker | May 5, 1874 |
| 1,794,326 | Sierer | Feb. 24, 1931 |
| 2,237,504 | Roath | Apr. 8, 1941 |
| 2,657,831 | Pierce | Nov. 3, 1953 |